J. D. C. OUTWATER.
Potato-Digger.

No. 67,068.

Patented July 23, 1867.

Witnesses:
Andrew De Lacy
John L. Kendall

Inventor:
Jacob D. C. Outwater

United States Patent Office.

JACOB D. C. OUTWATER, OF NEWARK, NEW JERSEY.

*Letters Patent No. 67,068, dated July 23, 1867.*

IMPROVEMENT IN POTATO-DIGGER.

*The Schedule referred to in these Letters Patent and making part of the same.*

TO ALL WHOM IT MAY CONCERN:

Be it known that I, JACOB D. C. OUTWATER, of the city of Newark, in the State of New Jersey, have invented certain new and useful Improvements in Ploughs or Potato-Diggers; and do hereby declare that the following is a full, clear, and exact description of the same, reference being had to the accompanying drawings, forming part of this specification. Of these drawings—

Similar letters of reference indicate corresponding parts in the several figures.

Figure 1:
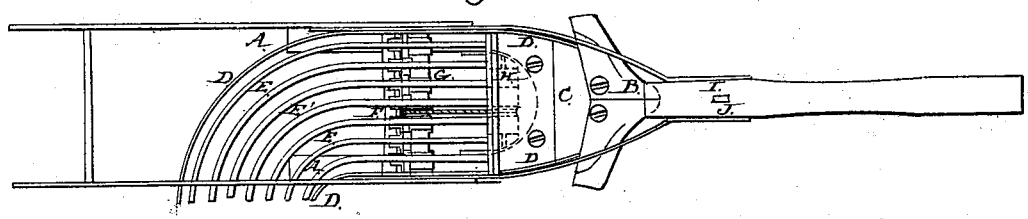
Figure 1 is a plan view of my plough.
Figure 2:
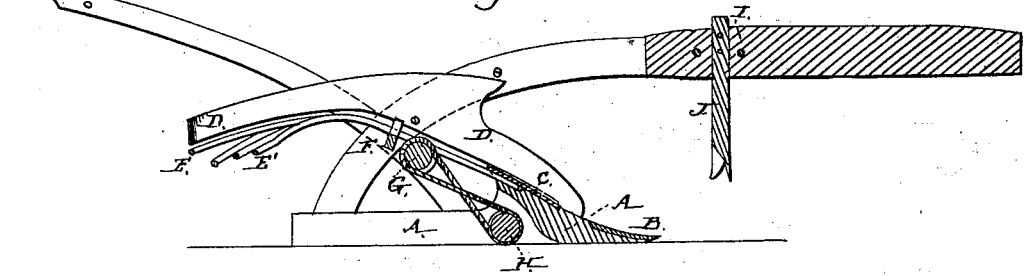
Figure 2 is a longitudinal vertical central section thereof.

In a plough intended to take potatoes out of the ground, it is necessary to so construct the parts that the row shall be sufficiently opened to permit of the taking out of the potatoes, and, during their removal from the row, to separate from them any soil that may be at the same time ploughed up with them. My improvements attached to or embodied in a plough render the digging up, separating from dirt, and removal away of the potatoes, an easy and simple matter.

To enable others to make and use my improvements, I will proceed to describe their construction and operation.

A is the sole, which may be constructed of light casting. Attached to the front part thereof is the double share B. Above this share, rising at about the same angle, is the lifting-board C; at either side of this is placed a side-board, D D. Between these side-boards, and projecting from underneath the lifting-board, are contained a number of tines, E E', &c., parallel to each other, and placed at a distance so that the potatoes will not fall through the spaces between. This series of tines passes up in the direction of an inclined plane some distance, and then curves round in a direction with the side-boards to the side of the plough, just in the rear, or nearly so, of the heels, so that the potatoes will be thrown to one side and out of the course of the plough, where they can be gathered up rapidly by a person following along with it for that purpose. These tines rest on a notched bar, F, placed a little below where they commence to sweep round to the side. Just below this notched bar is placed a cam-spindle, G, having four sides, with little square surfaces thereon alternately countersunk. This cam-spindle has a pulley-wheel on its axis, over which passes a chain or belt on to the gear-roller or drum H, (grooved also.) This grooved roller works in bearings placed in the sole just below the lifting-board. The periphery of this gear-roller or drum H extends below the plane of the lower face of the sole, and consequently adheres to the ground while the plough is in motion. This motion is imparted to the tines by means of the rotation of the cam-shaft, for as each of the four sides of the cam-shaft presents itself to the tines, the latter are either depressed or elevated alternately, and while one is depressed the adjoining one is elevated, &c. The notches in the bar keep the tines always in position, and at the same relative distance to each other.

The operation is as follows: The potatoes and loose dirt pass on to the share B, and are crowded up the lifting-board C and on to the tines. The tines, receiving motion from the cam-shaft, permit of the shaking off, breaking away, and falling through the spaces between the tines, of the dirt taken up with the potatoes. The potatoes thus freed are still crowded along the tines until they drop off at the side of the plough. At I, in the beam, I insert a coulter, J, for the purpose of opening the surface of the ground, and removing the stalk, sod, &c. This coulter is made adjustable in the slot I, that it may be raised or lowered as required. The coulter in some cases is dispensed with.

Having described my improvements, what I claim as new, and desire to secure by Letters Patent, is—

1. The combination of curved tines with the share, substantially as described.

2. The combination of curved tines, and geared mechanism for operating them, with the share, substantially as described.

3. The combination of curved tines and geared mechanism with the share and its sole, substantially as described.

4. The combination of all the last-mentioned elements with the coulter, substantially as described, with the pointed roller H.

JACOB D. C. OUTWATER.

Witnesses:
 ANDREW DE LACY,
 WM. SCOTT.